United States Patent [19]

Böhnstedt et al.

[11] Patent Number: 5,221,587
[45] Date of Patent: Jun. 22, 1993

[54] LEAD/SULPHURIC ACID STORAGE BATTERY

[75] Inventors: Werner Böhnstedt, Henstedt-Ulzburg; Christian Radel, Freigericht, both of Fed. Rep. of Germany

[73] Assignee: W. R. Grace & Co.-Conn., New York, N.Y.

[21] Appl. No.: 839,867

[22] Filed: Feb. 21, 1992

[30] Foreign Application Priority Data

Mar. 9, 1991 [DE] Fed. Rep. of Germany ....... 4108176

[51] Int. Cl.$^5$ ............................................. H01M 2/16
[52] U.S. Cl. .................................. 429/145; 429/176; 429/255
[58] Field of Search ............... 429/144, 145, 254, 255, 429/234, 176

[56] References Cited

U.S. PATENT DOCUMENTS

| | | | |
|---|---|---|---|
| 627,134 | 6/1899 | McDougall | 429/234 |
| 1,311,558 | 7/1919 | Hayward | 429/254 X |
| 1,981,736 | 11/1934 | Martindell | 429/255 X |
| 2,247,091 | 6/1941 | Jumau | 429/144 |
| 2,526,591 | 10/1950 | Szper | 429/254 |
| 3,518,124 | 6/1970 | Duddy | 136/27 |
| 4,213,815 | 7/1980 | Goldberg et al. | 156/244.1 |
| 4,371,596 | 2/1983 | Sheibley | 429/144 |

FOREIGN PATENT DOCUMENTS

| | | |
|---|---|---|
| 944440 | 6/1956 | Fed. Rep. of Germany . |
| 1596296 | 4/1971 | Fed. Rep. of Germany . |
| 2755256 | 7/1978 | Fed. Rep. of Germany . |
| 2924239 | 12/1979 | Fed. Rep. of Germany . |
| 3005297 | 8/1981 | Fed. Rep. of Germany . |
| 3222361 | 12/1983 | Fed. Rep. of Germany . |
| 2755319 | 7/1988 | Fed. Rep. of Germany . |
| 2440085 | 5/1980 | France . |
| 50-12537 | 2/1975 | Japan . |
| 54-156139 | 12/1979 | Japan . |
| 55-80267 | 6/1980 | Japan . |
| 60-250566 | 12/1985 | Japan . |

OTHER PUBLICATIONS

Database WPI, accession No. 75-04864W—[03], Derwent Publications Ltd., London GB; & JP-B-74 047 649 (Japan Storage Battery Co.) Dec. 12, 1974 *Abstract*.

Database WPI, accession No. 80-63457C [36], Derwent Publications Ltd., London GB; & JP-A-50 116 920 (Shin Kobe) Sep. 12, 1975.

Journal of Applied Electrochemistry, vol. 16, 1986, pp. 879-884, London GB; A. A. Jenkins et al.: "Antimony in lead-acid cells. III. Transport measurements" *Abstract; table 1*.

Journal of the Electrochemical Society: Electrochemical Science and Technology, vol. 121, No. 12, Dec. 1974, pp. 1541-1545, Manchester, N.H., U.S.; J. L. Weininger et al.: "Polymer-bonded negative electrodes for lead-acid batteries" *p. 1541: Experimental section; table 1*.

Chemical Abstracts, vol. 113, No. 8, Aug. 20, 1990, p. 203, abstract No. 62657e, Columbus, Ohio, U.S.; & JP-A-2 106 870 (Nippon) Apr. 18, 1990 *Abstract*.

Primary Examiner—Stephen Kalafut
Attorney, Agent, or Firm—John Dana Hubbard; William L. Baker

[57] ABSTRACT

A lead/sulphuric acid storage battery with negative and positive electrode plates, between which plastics microporous separators or glass-fiber separators are arranged, comprises un-crosslinked natural or synthetic rubber to combat antimony poisoning in the battery. The rubber is preferably in the form of a layer comprising un-crosslinked natural or synthetic rubber or is incorporated into a carrier layer on the separators, on the side facing the negative electrode plate. Alternatively, the un-crosslinked natural or synthetic rubber can be incorporated into the separator sheet or into the negative electrode plate. The deposition of the rubber as a coating onto the inner walls of the battery box is also possible.

13 Claims, No Drawings

LEAD/SULPHURIC ACID STORAGE BATTERY

The present invention relates to lead/sulphuric acid storage batteries, especially deep cycle batteries which are less susceptible to antimony poisoning.

BACKGROUND OF THE INVENTION

Lead alloys with a relatively high antimony content (currently approximately 4 to 10 wt-% Sb) are used as casting material for the electrodes of lead batteries for cyclical stresses Lead/antimony alloys have advantages both during the manufacturing process of the electrode frames (improvement of the flow characteristics of the molten metal in the moulds, greater hardness of the cast electrode frame) and during use of the battery; particularly in the case of cyclical loads, a good contact between terminal and active material is constantly ensured at the positive electrode in addition to mechanical stability, so that a premature drop in capacity does not occur ("antimony-free" effect).

However, antimony-containing positive electrodes have the disadvantage that antimony is dissolved ionically, migrates through the separator and, because it is nobler than lead, is deposited on the negative electrode. This process is described as antimony poisoning. Through a reduction of the overvoltage for hydrogen, it leads to increased water consumption and thus requires more maintenance. Attempts have already been made to completely or partially replace the antimony in the lead alloy with other alloy components, which, however, has not led to satisfactory results.

For the electrical separation of the positive from the negative electrode plates in storage batteries, porous separators are used which are arranged between the plates. In deep cycle batteries the most varied materials have already been tried and used as separators, but until now no system has been able to meet all requirements with the same degree of satisfaction. The problem of antimony poisoning in particular has not yet been satisfactorily solved; reducing or delaying the thus-caused effects could considerably lengthen the life of batteries Battery separators made from rubber are known In German patent 414 975 a rubber membrane made from latex is described. Like all natural substances (previously, even wooden separators were used for example), this system has only insufficient chemical stability vis-à-vis sulphuric acid and oxidative attacks, so that the necessary battery life is not reached.

A more recent version of a flexible rubber separator is described in U.S. Pat. No. 4 213 815. Here a mixture of natural rubber and copolymers, pore-formers and auxiliary agents is laminated onto a macroporous fleece, and the polymer mixture is then partially crosslinked by electron beams. In addition to the only low chemical stability vis-à-vis sulphuric acid and oxidative attack, this separator is over-flexible, so that it cannot give the necessary support to the negative electrode mass to prevent overexpansion in cyclically charged cells.

Improved chemical stability and more efficient support of the negative electrode mass is achieved by using porous hard-rubber separators. Such separators are described for example in German published applications 1 496 343 and 1 596 296. For process-related reasons, hard-rubber separators can only be manufactured with comparatively low porosity and thus display high electrical resistance for the necessary ion stream in the battery. Moreover, as a result of the vulcanization, the hard-rubber structure filled with silica becomes brittle, so that incorporation into the cell proves very difficult.

To improve this situation, it has been proposed to laminate hard-rubber separators to a woven or non-woven material. German published application 29 24 239 describes for example the lamination of a filled, vulcanized rubber layer to a polyester fleece, thus producing in turn separators with comparatively high electrical resistance or, if sheets of very thin thickness are produced, giving rise to cracks due to the brittleness of the hard-rubber and a lack of support effect A similar embodiment is known from German published application 30 05 297 in which the microporous separator is provided with a glass-wool fleece on the side facing the negative plate. In addition to an increase in the electrical resistance, the danger exists with such separators that charging gases will accumulate in the glass-wool fleece and thus trigger off a series of undesired secondary reactions. This problem is even more pronounced if the entire space between the electrodes is filled, as is proposed for example in German patent 944 440. Here a glass-fiber fleece is processed with a paste made of mineral substances and rubber as binding agent to produce a separator.

Nowadays, separators based on thermoplastic or thermosetting plastics are predominantly used as separators for lead/lead dioxide batteries with cyclical stress. Especially widely used is a separator which consists of high-molecular-weight polyethylene containing as pore formers silica and a mineral oil, cf. German patent 1 496 123. A likewise extensively used microporous separator made of a thermoset resin is proposed in German patent 1 596 109. Moreover, there are other separators based on polyvinyl chloride or mixtures of other polymers and also with and without pore forming fillers. For applications with average cyclical loads, separators based on glass-fibers are also used. All these separators made of synthetic plastics or glass-fibers have the characteristic that they have little or no effect on the chemical reaction sequences in an battery — also not an advantageous one, e.g. delaying the antimony poisoning. On the other hand their chemical stability and their low electrical resistance are very advantageous.

It has been shown that the processes connected to antimony poisoning can be influenced by separators; however, the mechanism of their influence is unknown and the wooden or hard-rubber separators considered in this context display other serious disadvantages, as previously mentioned.

Previous theories and proposals predominantly assume a capture mechanism on the basis of a chemical reaction with the antimony Thus, sulphur (Japanese published application 60-250 566) or organic sulphur compounds including hard-rubber (German published application 31 11 473), resins with aminophosphonic groups (French patent 2 440 085), tannic acid, sodium alizarin sulphonate, salicylic acid, p-cresol, resorcinol, pyrogallol, hydroquinone, catechol et al. (Japanese published application 55-80 267), ethylene diamine tetraacetic acid (EDTA) (Japanese published application 54-156 139), polymethacrylic acid and polyvinyl alcohol (German published application 2 755 319), crosslinked polyhydroxy ethyl methacrylate combined with other polymers (German published application 2 755 256) or even polyethylene oxide (U.S. Pat. No. 3 518 124) have been proposed as suitable additives. This list by no means claims to be exhaustive; however, it must be stated that none of these proposals has found acceptance because the effect was either too small or not maintained for a sufficiently long time.

Other proposals for delaying the antimony poisoning with the aid of separators are based on physical interactions: Japanese published application 50-12 537 attributes the effect to low average pore diameter, although there are many examples demonstrating the opposite. German published application 32 22 361 claims an enlargement of the inner surface of the separator by coating or detaching soluble constituents, to increase the adsorption capacity for antimony ions. The thus achievable delay in the antimony poisoning can, however, not justify the costly production procedure.

SUMMARY AND OBJECTS OF THE INVENTION

It is an object of the invention to achieve a clear increase in the cycle life in the case of a lead/sulphuric acid storage battery, particularly for cyclical conditions of use, by considerably delaying the antimony poisoning and avoiding the over-charge problem, without having to switch to battery separators, which, compared to the currently employed plastics separators, do not display low electrical resistance, low acid displacement or give good support to the negative electrode.

To achieve this object it is proposed to use, in a lead/sulphuric acid storage battery with negative and positive electrode plates between which separators of microporous plastics or of glass-fiber or of both are arranged, un-crosslinked natural or synthetic rubber. According to one preferred embodiment of the invention the separator of microporous plastics or of glass fibers laminated to a microporous plastics sheet can be provided on either or both surfaces with a layer comprising the rubber. The rubber-containing layer is preferably provided on the side of the separator facing the negative electrode plate.

On the other hand it is also possible to incorporate the uncrosslinked rubber in the separator sheet or a layer thereof, or in the negative electrode plate. Another embodiment involves depositing the rubber as a coating onto the inner walls of the battery box.

DETAILED DESCRIPTION OF THE INVENTION

It has surprisingly been found that these measures considerably delay the antimony poisoning, without other disadvantages having to be accepted, because plastics separators or glass-fiber separators can be used with all their known advantageous characteristics. This particularly applies also if the battery separator is provided with an extremely thin layer of the un-crosslinked rubber. This combination avoids the disadvantage of the short life of un-crosslinked rubber separators due to their lack of chemical resistance. Furthermore, the layer can be applied very thinly so that neither electrical resistance nor acid displacement are excessively increased, because the conventional micro-porous separator assumes the support function and, because of its mechanical stability, also gives sufficient support to the negative electrode thereby protecting it against overexpansion. Rubber layers having a thickness of 0,05 to 0.6 mm and particularly 0.2 to 0.4 mm have proved suitable.

At present it is not yet possible to fully explain the success of the invention. Contrary to earlier assumptions, any sulphur content is clearly not decisive because comparative tests have shown that the antimony poisoning can be only slightly delayed by adding sulphur containing vulcanized rubber.

Suited as rubber are, in addition to natural rubber (e.g. commercial products such as Neotex 4/404, Neotex Type 15, Neotex P6, Neotex LN, Neotex ISV and Neotex DC from Weber & Schaer, Hamburg) also the known synthetic rubbers such as methyl rubber, polybutadiene, chloropene rubbers and copolymer rubbers. The latter include styrene/butadiene rubbers, acrylonitrile/butadiene rubbers, ethylene/propylene rubbers (EPM and EPDM) and ethylene/vinyl acetate rubbers. Further to be mentioned are butyl rubber, bromobutyl rubber, polyurethane rubber, epichlorhydrin rubber, polysulphide rubber, chlorosulphonyl polyethylene, polynorbornene rubber, acrylate rubber, fluorine rubber and silicone rubber.

For manufacturing the separators according to the invention, conventional microporous separators as described above which generally display a porosity between 40 and 90 %, are coated on one side, preferably on the side facing the negative electrode, with a liquid slurry comprising un-crosslinked rubber, silica and water, and are then dried. For better wettability of this layer, known wetting agents can be added to the slurry for use in lead batteries. After drying, a porous layer forms which adheres very well to the microporous separator and increases electrical resistance only insignificantly (approximately 50 $m\Omega.cm^2$); acid displacement likewise only increases by approximately 60 $ml/m^2$ separator surface.

A further embodiment of the present invention involves depositing the un-crosslinked rubber onto porous carrier materials by impregnation and drying (usually 20 to 60 g rubber/$m^2$) and arranging this impregnated carrier on the side of the conventional microporous separator facing the negative electrode. For this purpose, glass mats, fleeces or fabrics made from synthetic fibers or mixtures with synthetic fibers or paper as described above can be used as carrier materials. Bonding can be carried out by compression or adhesion.

Finally, sufficiently porous separators, e.g. glass-fiber separators, can be impregnated with a rubber latex and subsequently dried.

The following examples serve to illustrate the invention.

EXAMPLE 1

To 77 g of a mixture comprising 23.7 wt-% silica (Akzo: Ketjensil SM 604 G), 2.4 wt-% cellulose fibers (Rettenmaier: Arbocell 60/30), 0.8 wt-% sodium alginate (Kelco International GmbH: Manutex RD) and 73.2 wt-% ion-exchanged water were added under stirring 23 g of a mixture comprising 90 wt-% natural latex milk (Weber & Schaer, Neotex 4/04), 8.75 wt-% of an aqueous 13.5 wt-% lauryl sulphate Na-salt solution and 1.25 wt-% of a standard commercial pigment (Colanyl N, Hoechst). The obtained paste was deposited with the aid of a coating knife in a thickness of approximately 0.4 mm onto the side of a microporous separator facing the negative electrode. The porous rubber $SiO_2$ coat was dried for 20 minutes at 110° C. The dried coat contained approximately 50 g of natural rubber/$m^2$. In an accelerated life test, a separator manufactured in this way reached a cycle count of 150 cycles. In comparison, an uncoated separator achieved only approximately 70 cycles until failure.

EXAMPLE 2

A glass mat with a thickness of approximately 0.4 mm and a square metre weight of approximately 60 g, comprising 60 wt-% glass-fibers with a typical fiber diameter of 13 μm, 6 wt-% cellulose, 4 wt-% polyester fibers and 30 wt-% acrylate binder, was impregnated with a natural latex milk. The latex had a natural rubber content (dry rubber content, DRC) of approximately 60 wt-%. Using a pair of rubber steel rolls, excess latex was pressed out at a pressure of 0.24 kp/mm. The thus obtained still damp glass rubber mat contained, after drying for 5 minutes at approximately 120° C., approximately 50 g rubber/m$^2$.

The glass rubber mat was bonded to a microporous DARAK® (Grace GmbH) separator on the side facing the negative electrode.

The thus manufactured separator was subjected to a DIN 43 539-03 battery cycle test. Whilst a battery with identical separators without impregnated glass rubber mat reached a pre-set degree of antimony poisoning (corresponding to 2.5 V final cell charging voltage) after approximately 600 cycles, 1200 cycles were measured for the separator with glass rubber mat according to the invention.

EXAMPLE 3

A web comprising glass-fibers, polyester fibers, silica and carboxylgroup-containing polystyrene as binding agent was impregnated until saturationin a calandering process with an aqueous solution comprising the following:

2 wt-% of a carboxylated polystyrene latex
5 % non-ionic/anionic surfactants
15 wt-% phenolic resin
18 wt-% natural rubber latex.

Between 17 and 22 wt-% (relative to the web) of the solution constituents were absorbed by the fiber web.

The saturated web was subsequently dried and cured at 150° C. While the present invention has been described in reference to its preferred embodiments, other variations, modifications and equivalents would be obvious to one skilled in the art and it is intended in the specification and appended claims to include all such variations, modifications and equivalents therein.

What we claim is:

1. A lead/sulphuric acid storage battery with improved stability against antimony poisoning comprising a battery box with inner and outer walls, one or more negative and positive electrodes plates, between which separators formed of microporous plastic are arranged, and a layer of uncrosslinked natural or synthetic rubber provided on a surface of the separators.

2. Battery according to claim 1, wherein the separators are provided with a layer of uncrosslinked natural or synthetic rubber.

3. Battery according to claim 1 wherein the layer of uncrosslinked natural or synthetic rubber has a thickness of 0.05 to 0.6 mm.

4. Battery according to claim 3 wherein the separators are provided on the side facing the negative electrode plate with the layer of uncrosslinked natural or synthetic rubber.

5. Battery according to claim 1 wherein the separators are microporous plastic separators provided with a porous carrier layer on which in formed the uncrosslinked natural or synthetic rubber layer.

6. Battery according to claim 5 wherein the microporous plastics separators are provided, on the side facing the negative electrode plate, with a porous carrier layer of glass fibers impregnated with un-crosslinked natural or synthetic rubber.

7. A separator for use in a lead/sulphuric acid storage battery comprising a microporous plastic separator sheet having a layer of uncrosslinked natural or synthetic rubber applied to one of its surfaces.

8. Separator according to claim 7 wherein the separator is provided with a layer comprising uncrosslinked natural or synthetic rubber which layer has a thickness of 0.05 to 0.6 mm.

9. Separator according to claim 7 wherein the separator is provided on its side facing the negative electrode plate with a layer comprising un-crosslinked natural or synthetic rubber.

10. Separator according to claim 7 wherein the separator is provided, on the side facing the negative electrode plate, with a porous carrier of glass fibers impregnated with un-crosslinked natural or synthetic rubber.

11. A separator for lead/sulphuric acid batteries comprising a separator sheet of microporous plastic and wherein uncrosslinked natural or synthetic rubber is incorporated into the separator sheet.

12. A lead/sulphuric acid storage battery with improved stability against antimony poisoning comprising a battery box with inner and outer walls, one or more negative and positive electrodes plates, between which separators arranged, and a layer of uncrosslinked natural or synthetic rubber incorporated into the one or more negative electrode plates.

13. A lead/sulphuric acid storage battery with improved stability against antimony poisoning comprising a battery box with inner and outer walls, one or more negative and positive electrodes plates, between which separators are arranged, and a layer of uncrosslinked natural or synthetic rubber provided on the inner walls of the battery.

* * * * *